United States Patent
McCroskey, Sr.

[11] 3,981,037
[45] Sept. 21, 1976

[54] PROCESS FOR INSTALLING AN ARCH SUPPORT IN A CONVENTIONAL SHOE

[75] Inventor: George A. McCroskey, Sr., Florence, Ala.

[73] Assignee: The Raymond Lee Organization, Inc., a part interest

[22] Filed: Aug. 11, 1975

[21] Appl. No.: 603,643

[52] U.S. Cl................ 12/146 S; 36/44; 36/76 R
[51] Int. Cl.².......... A43D 00/00; A43B 13/38; A43B 13/42
[58] Field of Search............ 12/146 S, 146 R, 1 R, 12/142 P; 36/44, 43, 71, 2.5 AL, 28, 25 R, 76 R

[56] References Cited
UNITED STATES PATENTS

| 3,736,673 | 6/1973 | Dubner | 36/44 |
| 3,785,069 | 1/1974 | Brown | 36/44 |
| 3,903,621 | 9/1975 | Dubner | 36/44 |

Primary Examiner—Patrick D. Lawson

[57] ABSTRACT

A hole is drilled into the sole of a conventional shoe. The user's foot is then placed into the shoe and a curable plastic material is injected into the shoe. The hole is located directly below the metatarsal arch of the user's foot. The foot is removed after the plastic has set.

2 Claims, 2 Drawing Figures

PROCESS FOR INSTALLING AN ARCH SUPPORT IN A CONVENTIONAL SHOE

SUMMARY OF THE INVENTION

In this process, a curable plastic material is injected into the shoe into which an arch support is to be installed, while the user's foot is located in the shoe. The material flows between the foot and the shoe to conform to the individual and particular shape of the user's foot. The user's foot is removed when the material has set, and the material is left in place, to completely cure inside the shoe. The resulting arch support is custom fitted to the user's foot.

DETAILED DESCRIPTION OF PREFERRED EMBODIMENTS

Figure 1:
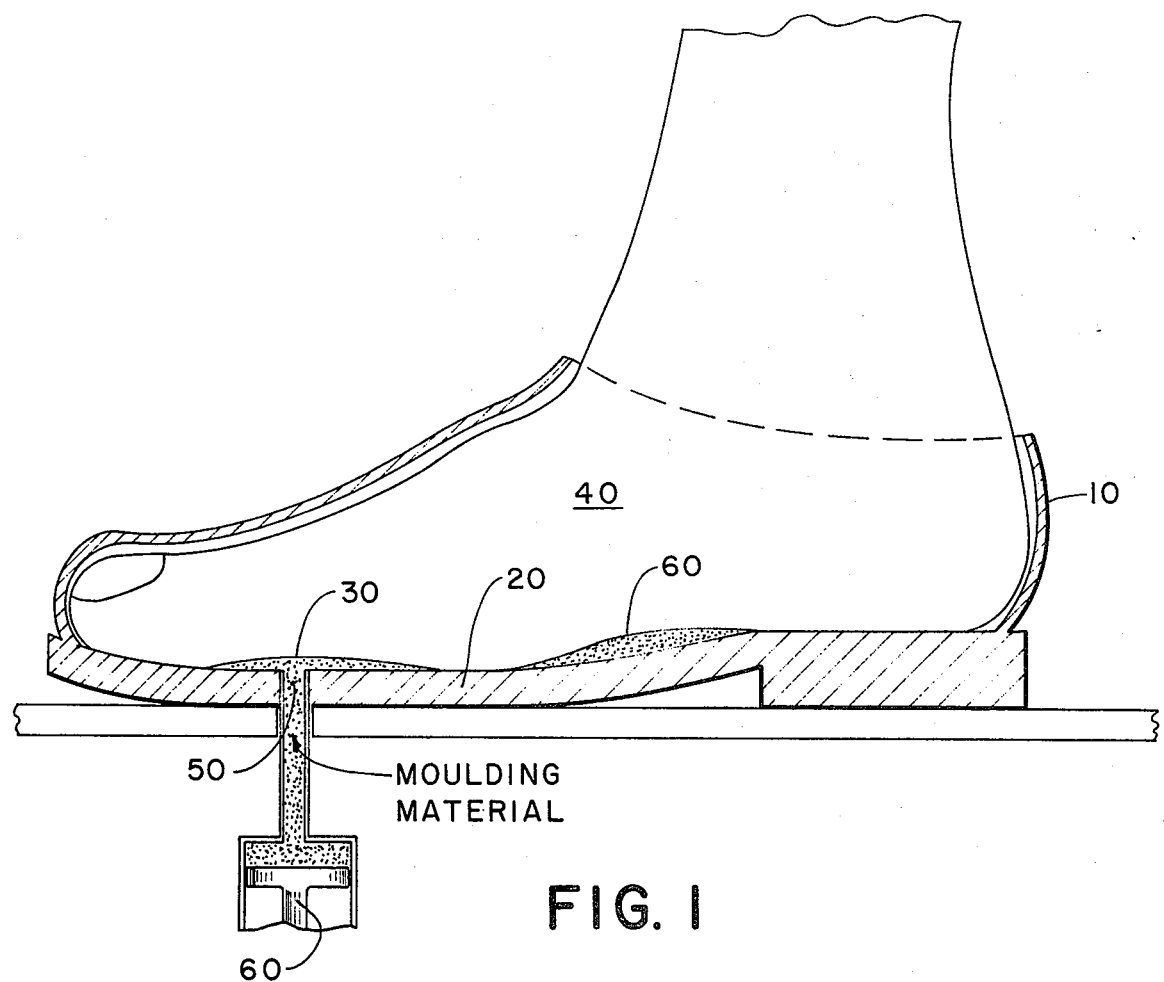
FIG. 1 shows the invention in use.
Figure 2:
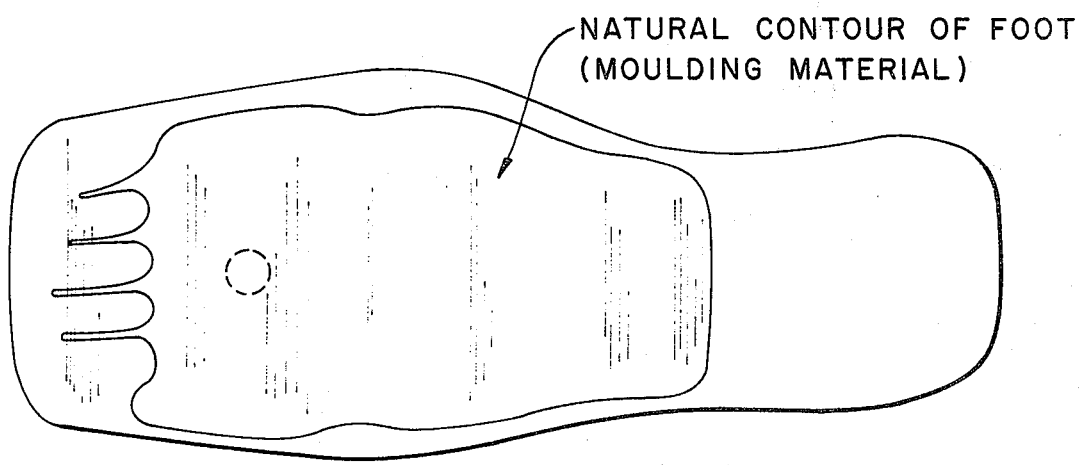
FIG. 2 shows a top view of the product produced by the invention.

A conventional shoe 10 has a sole 20 into which a hole has been drilled, at a point directly below the metatarsal arch 30 of the user's foot 40 which has been placed into the shoe. Viscous liquid molding material 50, as for example a suitable plastic, is injected into the hole by a pump 60 and flows into the space between the top surface of the sole of the shoe and the underside of the user's metatarsal arch and the user's longitudinal arch 70.

The material quickly takes an initial set in air at ambient temperature whereby the user can remove the foot. This set also seals the hole in the sole. Thereafter, the material is allowed to cure for a period of some hours whereby the support is completely formed in a yielding but dimensionally fixed pattern.

Thus the user has a properly shaped and sized support which conforms to the foot in every way and provides maximum comfort and orthopedic fit.

Although the invention has been described with particular reference to the drawings, the protection sought is to be limited only by the terms of the claims which follow.

What is claimed is:
1. A process for installing arch supports in conventional shoes, comprising:
    drilling a hole in the sole of the shoe at a point in the shoe which is directly beneath the metatarsal arch of the user's foot, when the foot has been placed into the shoe;
    placing the user's foot into the shoe; injecting a settable and curable plastic material through the hole into the shoe directly against the user's foot to completely fill at least the area between the sole and the wser's arch to cause an arch support to be molded therebetween;
    allowing said support to set; and removing the user's foot after the support has set.
2. The process of claim 1 wherein the support is allowed to cure.

* * * * *